United States Patent [19]
Matsubayashi

[11] Patent Number: 5,868,002
[45] Date of Patent: Feb. 9, 1999

[54] CONDENSER WITH A LIQUID-RECEIVER

[75] Inventor: Hiroshi Matsubayashi, Oyamashi, Japan

[73] Assignee: Showa Aluminum Corporation

[21] Appl. No.: 897,725

[22] Filed: Jul. 21, 1997

[30] Foreign Application Priority Data

Jul. 29, 1996 [JP] Japan ................................. 8-199283

[51] Int. Cl.⁶ .................................................. F25B 39/04
[52] U.S. Cl. .................................................. 62/507; 62/509
[58] Field of Search ............................. 62/507, 509, 506

[56] References Cited

U.S. PATENT DOCUMENTS 5,228,315  7/1993  Nagasaka et al. .......................... 62/509

FOREIGN PATENT DOCUMENTS

| 0 480 330 A2 | 4/1992 | European Pat. Off. . |
| 0 516 413 A1 | 12/1992 | European Pat. Off. . |
| 0 769 666 A1 | 4/1997 | European Pat. Off. . |

OTHER PUBLICATIONS

Patent Abstracts of Japan, vol. 018, No. 363 (M–1635), Jul. 8, 1994 and JP 06 094330 A (Zexel Corp.), Apr. 5, 1994.
Patent Abstracts of Japan, vol. 096, No. 001, Jan. 31, 1996 and JP 07 239082 A (Nichirin:KK), Sep. 12, 1995.
Patent Abstracts of Japan, vol. 018, No. 550 (M–1690), Oct. 20, 1994 and JP 06 194005 A (Honda Motor Co. Ltd.), Jul. 15, 1994.
Patent Abstracts of Japan, vol. 017, No. 379 (M–1447), Jul. 16, 1993 and JP 05 066074 A (Hitachi Ltd.;Others:01), Mar. 19, 1993.

*Primary Examiner*—William E. Tapolcal

[57] ABSTRACT

The present invention provides a condenser with a liquid-receiver that enables the omission of piping for connecting a liquid-receiver and a condenser. The liquid-receiver is connected to the condenser by a liquid-receiver holder. The liquid-receiver holder also is connected to the header of the condenser body. The liquid-receiver is flange connected to the liquid-receiver holder, whereby the liquid-receiver is held to the condenser body and both of them are internally communicated with one another through a passage formed in the liquid-receiver holder.

18 Claims, 11 Drawing Sheets

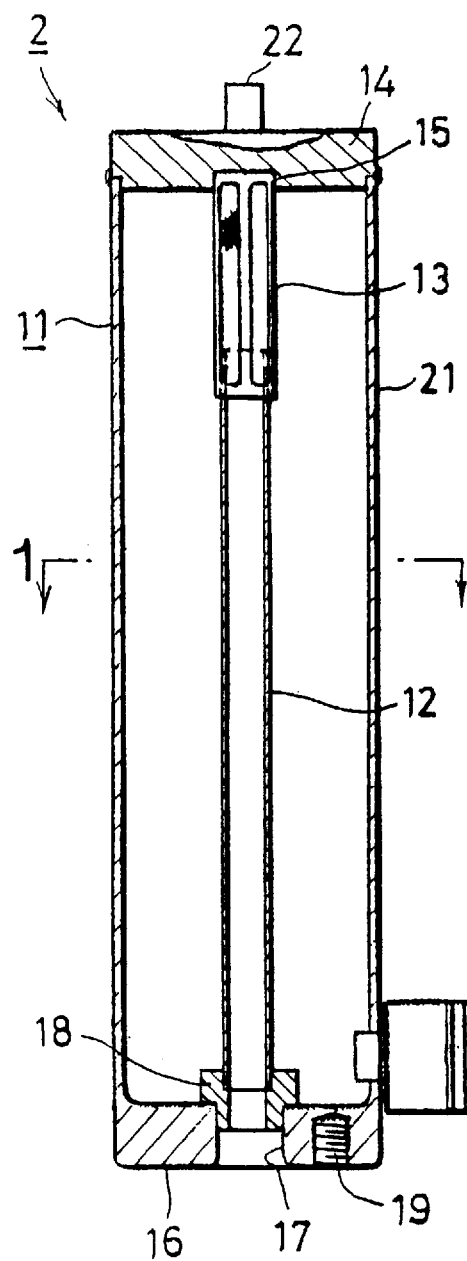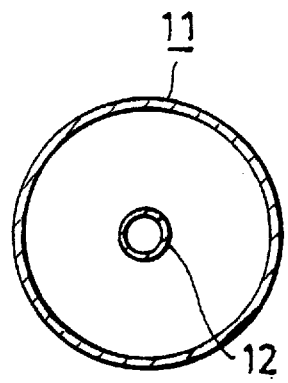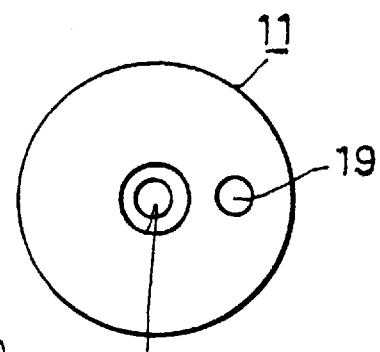
FIG. 3A
FIG. 3B
FIG. 3C

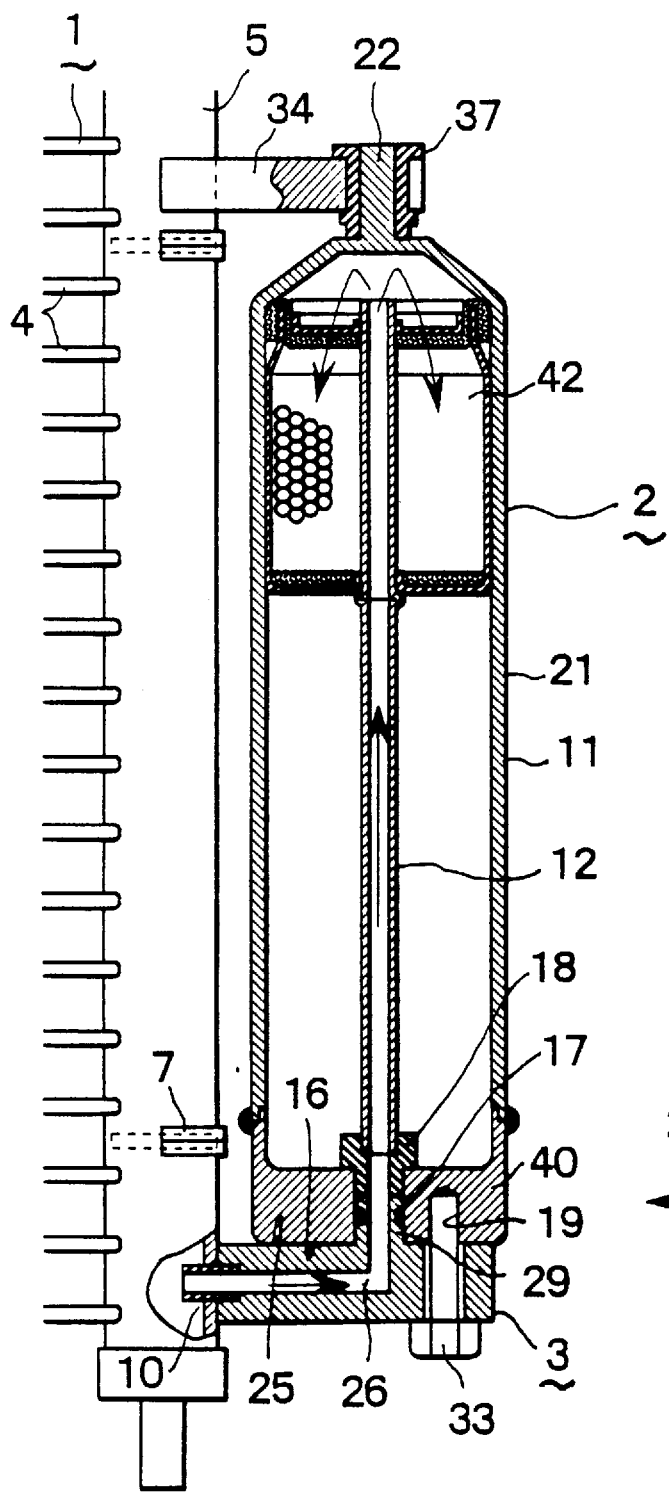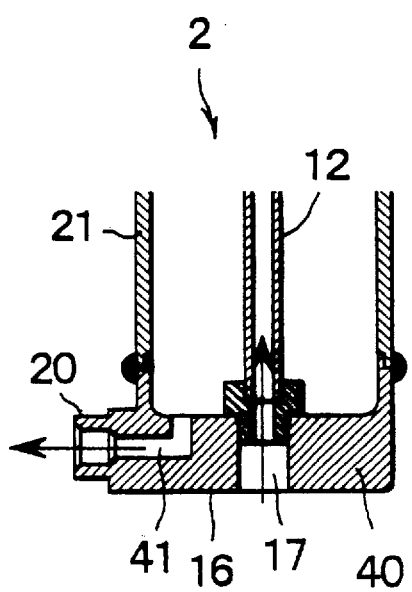
FIG. 7A
FIG. 7B

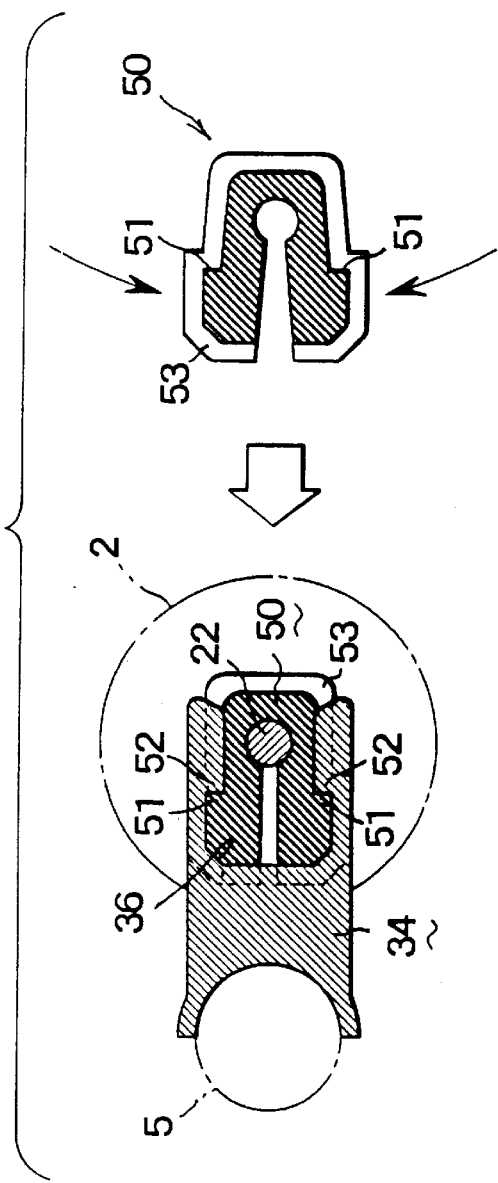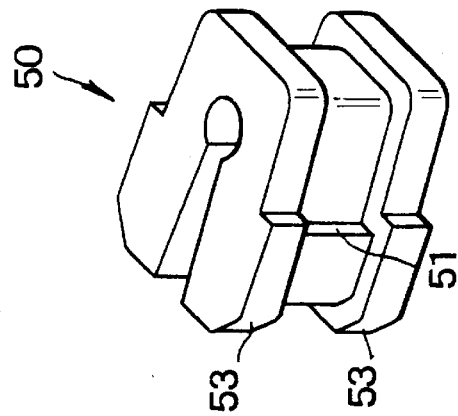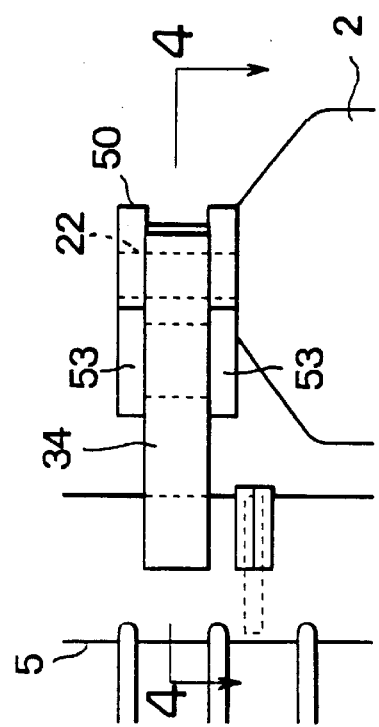

CONDENSER WITH A LIQUID-RECEIVER

BACKGROUND OF THE INVENTION

1. Field of the Invention

The present invention relates to a condenser having a liquid-receiver for use in an automobile air conditioning system, or the like.

2. Description of the Related Art

Conventional liquid-receivers for use in an automobile air conditioning system are shown, for example, as liquid-receiver 70 in FIG. 12A. The conventional liquid-receiver 70 comprises a receiver tank 71 having at its upper end a header 72. The header 72 includes a refrigerant inlet portion 73 and a refrigerant outlet portion 74, each communicating with the inside of the receiver tank 71. In the receiver tank 71, an outlet pipe 75 communicating with the outlet portion 74 is vertically disposed with the lower end positioned near the bottom inside of the receiver tank 71. A refrigerant is introduced into the receiver tank 71 through the inlet portion 73 and then the refrigerant is divided into a liquid refrigerant and a gaseous refrigerant, such that the liquid refrigerant descends by its own weight toward the bottom of the tank 71 and the gaseous refrigerant rises. As a result, only the liquid refrigerant is introduced in the outlet pipe 75 from the lower end thereof and rises to flow out of the outlet portion 74.

As shown in FIG. 12B, the liquid-receiver 70 typically is fixed to a body of a car by a bracket 90 with the inlet portion 73 of the liquid-receiver 70 and a refrigerant outlet portion 77 of a condenser 76 being connected with each other by way of a piping 79.

When the liquid-receiver 70 is fixed to the body of a car by the bracket 90 as mentioned above, however, the bracket 90 is structurally restricted depending on the structure of the body of a car. Therefore, many types of brackets each for exclusive use of the model of a car should be prepared.

Because the liquid-receiver 70 and the condenser 76 are fixed to different portions of the body of a car as mentioned above, the piping 79 for connecting them is required, resulting in increased number of parts. Further, in addition to installing the condenser 76 to the body of a car, the liquid-receiver 70 also should be fixed to the body of a car by the bracket 90. Furthermore, a bothersome task is required to connect piping 79 in such a manner so that one end of the piping 79 is connected to the inlet portion 73 of the liquid-receiver 70 and the other end thereof is connected to the outlet portion 77 of the condenser 76. As will be apparent from the above, installing the liquid-receiver requires many steps of works and is bothersome and troublesome.

SUMMARY OF THE INVENTION

Thus, there exists a need to provide a liquid-receiver for a condenser that does not suffer from the aforementioned disadvantages. It is therefore an object of the present invention to provide a combination structure including a condenser and a liquid-receiver which enables a sharing of parts, a reduction of parts and efficient mounting to the body of a car, and which also has various kinds of advantages and can exhibit high usefulness.

In accordance with these and other objects of the invention, there is provided a condenser with a liquid-receiver that includes a condenser body having a hollow header, a plurality of tubes connected to the hollow header in fluid communication therewith, and a refrigerant outlet connected to the header, a liquid-receiver and a liquid-receiver holder for holding the liquid-receiver to the condenser body. The liquid-receiver has at its end portion a refrigerant inlet portion. The liquid-receiver holder is provided with a refrigerant passage therein. The holder is connected to the header with one end of the refrigerant passage being in fluid communication with the refrigerant outlet of the header. The holder is also connected to the end portion of the liquid-receiver by a flange coupling such that the other end of the refrigerant passage is in fluid communication with the refrigerant inlet portion of the holder.

In this structure, because the liquid-receiver is mounted-to the header of the condenser body by way of the liquid-receiver holder, the structure of the liquid-receiver holder is not limited to the structure of the body of a car to be mounted, enabling a sharing of parts of liquid-receiver holder. Further, because the liquid-receiver can be mounted to the condenser body in advance, the condenser body and the liquid-receiver can be installed to the body of a car at one time by only installing the condenser body thereto, thus enabling efficient installation to the body of a car.

The liquid-receiver holder of the invention is provided with a refrigerant passage therein and is connected to the header with one end of the refrigerant passage being in fluid communication with the refrigerant outlet of the header. The holder also is connected to the end portion of the liquid-receiver such that the other end of the refrigerant passage is in fluid communication with the refrigerant inlet portion. Therefore, connecting the liquid-receiver to the condenser body by the liquid-receiver holder can simultaneously accomplish connecting the refrigerant outlet portion of the condenser and the refrigerant inlet portion of the liquid-receiver, thus enabling an omission of a piping, the number of parts and annoying piping work.

Further, the liquid-receiver has at its end portion a refrigerant inlet portion and the liquid-receiver holder is connected to the end portion of the liquid-receiver by a flange coupling. In other words, the end portion of the liquid-receiver has a relatively large area to which the refrigerant inlet portion is formed for a flange connection. Therefore, it is easy to provide a compact structure having a large flange connection area without adopting a special structure to keep a large flange connection area, and the liquid-receiver and the holder can be firmly and stably connected with one another by flange connection.

Other objects and features will be apparent from the following detailed description of the invention with reference to the attached drawings.

BRIEF DESCRIPTION OF THE DRAWINGS

The present invention will be more fully described and better understood from the following description, taken with the appended drawings, in which:

FIG. 3A is a vertical cross-sectional view of the liquid-receiver, FIG. 3B is a cross-sectional view taken along the line 1—1 in FIG. 3A and FIG. 3C is a bottom view of the liquid-receiver;

FIG. 7A is a cross-sectional front view of a modified embodiment of a liquid-receiver and FIG. 7B is a cross-sectional front view of the lower portion of the liquid-receiver;

FIG. 11A shows a modified embodiment of a mounting structure of an upper portion of the liquid-receiver to the header, and is a cross-sectional plan view taken along the line 4—4 of FIG. 11B showing a clip fixed to the stay and a method of the fixing, FIG. 11B is a front view thereof, and FIG. 11C is a perspective view of the clip;

DETAILED DESCRIPTION OF THE PREFERRED EMBODIMENTS

Preferred embodiments of the present invention will now be described, in detail, with reference to the accompanying drawings.

Figure 1:
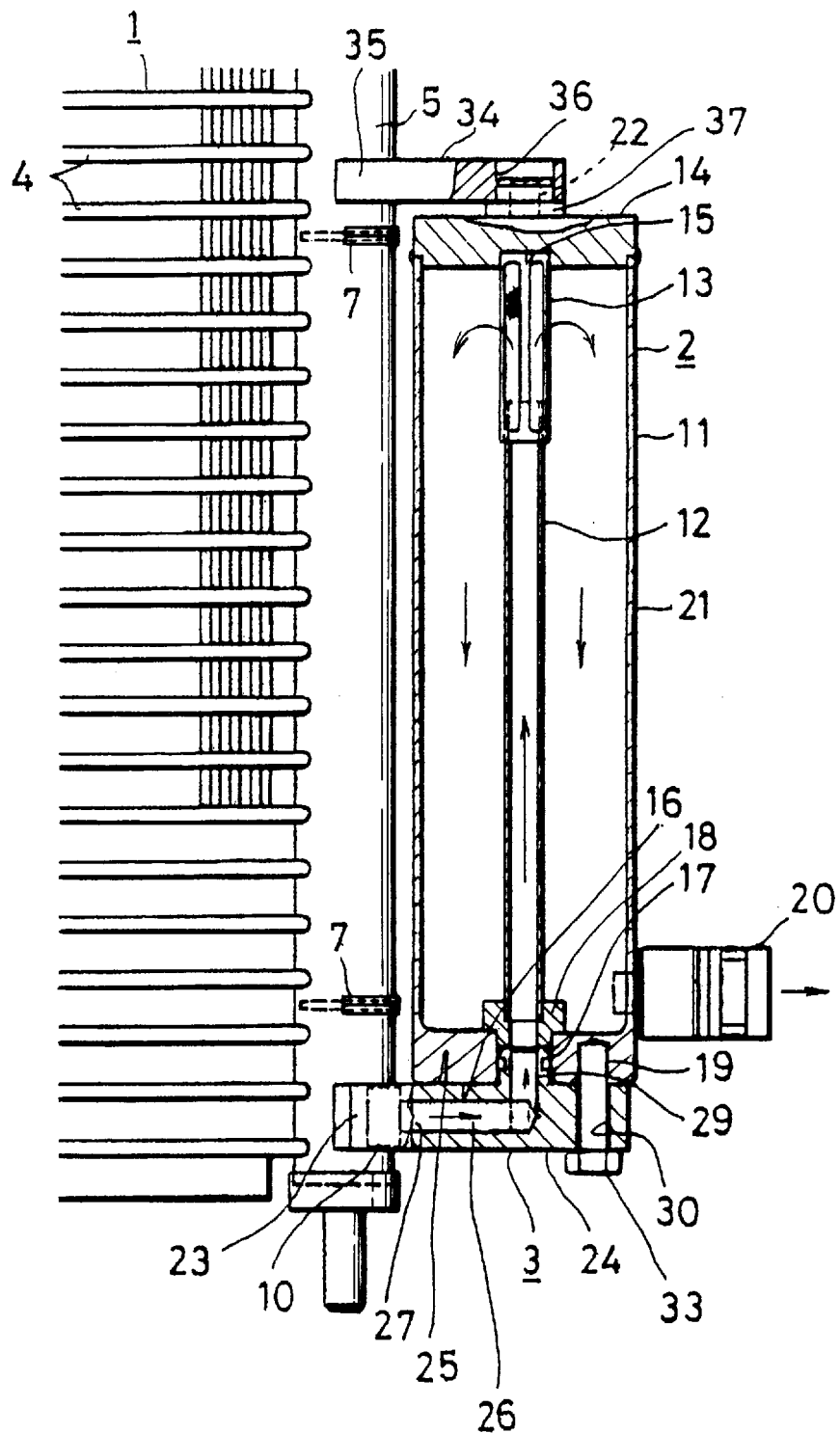
FIG. 1 is an enlarged cross-section of a liquid-receiver connected to a condenser, in a preferred embodiment of a condenser with a liquid-receiver according to the present invention.

A condenser with a liquid-receiver shown in FIGS. 1 to 6B illustrates a preferred embodiment of the present invention and can be used as an automobile air conditioning system. In FIGS. 1, 2A and 2B, the numerals 1 to 3 denote a condenser body, a liquid-receiver and a liquid-receiver holder, respectively.

Figures 2A, 2B:
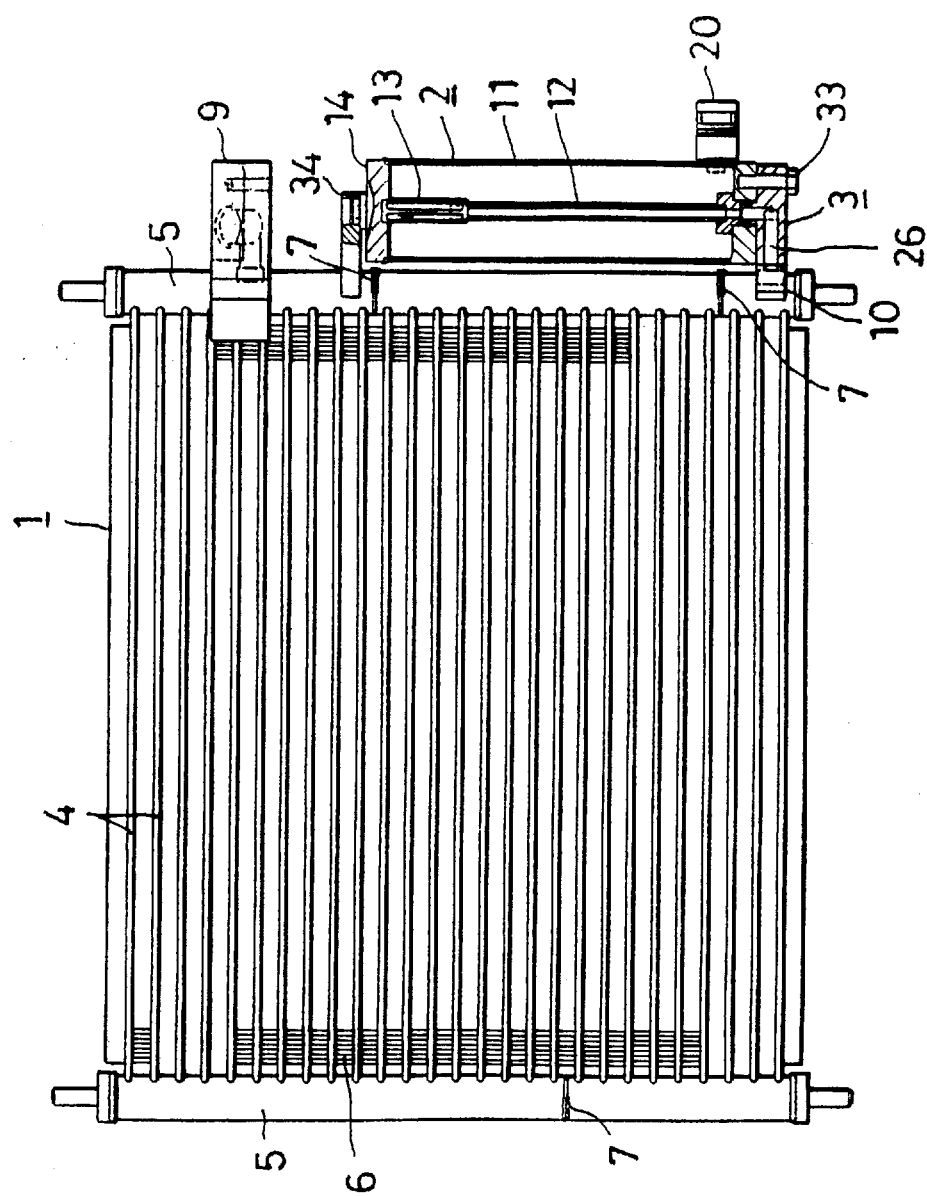
FIG. 2A is a partially broken front view of the condenser with a liquid-receiver.
FIG. 2B is a side view of the condenser with a liquid-receiver.
Figure 4:
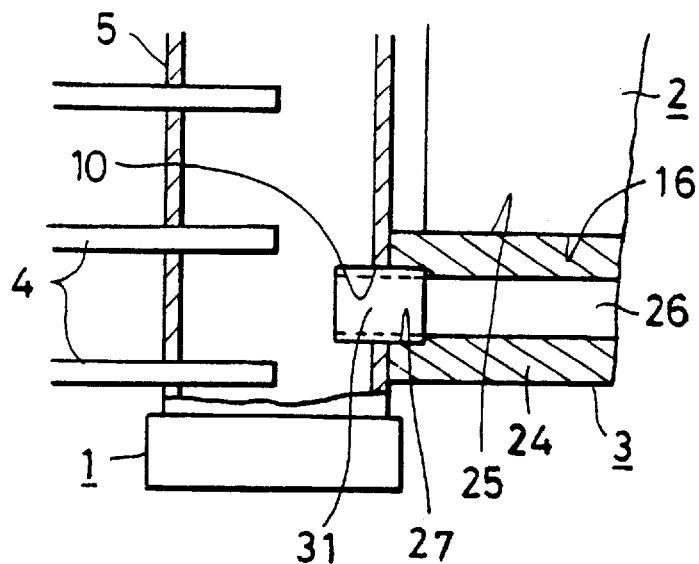
FIG. 4 is an enlarged cross-section of a connecting portion of the liquid-receiver holder and the header.

The condenser body 1 is the so-called multi-flow type aluminum heat exchanger. As shown in FIG. 2A, the condenser body 1 includes a plurality of horizontally disposed aluminum heat exchanging flat tubes 4 each disposed parallel with each other at a certain interval in the vertical direction, at least one, and preferably a pair of cylindrical aluminum hollow headers 5 to which each end of each tube 4 is inserted in fluid communication. Aluminum fins 6 typically are disposed between adjacent tubes 4. Each header 5 is, at a certain height, divided along the length thereof by partitions 7 into a plurality of chambers, and a refrigerant inlet union 9 is connected to the upper side portion of the right side header 5 in fluid communication. As shown in more detail in FIG. 4, a refrigerant outlet opening 10 is formed on the lower side portion of the right side header 5. Gaseous refrigerant flowed into the header 5 through the refrigerant inlet union 9 is passed through the tubes 4 in a zigzag manner and condensed. The thus condensed refrigerant is flowed out through the refrigerant outlet opening 10.

As shown in FIG. 1 and FIGS. 3A to 3C, the liquid-receiver 2 includes a vertically disposed elongate cylindrical tank 11 having an inner pipe 12 therein. The tank 11 has a thick bottom wall having a flat flange connection face 16 to be fitted to the liquid-receiver 3. In the flange connection face 16, a round refrigerant inlet port 17 is formed through the center of the bottom wall of the tank 11 and a thread hole 19 is formed adjacent to the inlet port 17 for flange connection. Because the lower end surface of the tank 11 has a large flat area, a relatively large size thread hole 19 which enables a strong flange connection can be formed at the lower end surface.

The inner pipe 12 disposed in the tank 11 is fixed therein in the following manner. A cylindrical holder 18 having a shoulder made of a rubber such as EPDM, SBR, or the like, is fitted in the inlet port 17 from the inside of the tank 11. The lower end portion of the inner pipe 11 is fitted in an axial hole formed in the holder 18. Thus, the inner pipe 12 is vertically disposed along an axial portion of the tank 11 in communication with the refrigerant inlet port 17. Breakage of the connection of the inner pipe 12 and the tank 11 caused by stress concentration can be effectively prevented by connecting the lower end portion of the inner pipe 12 to the tank 11 by way of the holder 18 which preferably is made of rubber. In addition, this connection enables the inner pipe 12 to be communicated with the inlet port 17 with good sealing. The connection also can endure vibrations of a body of a car especially when the condenser is used in an automobile.

A strainer 13 can be fixed on the top of the inner pipe 12, and the upper portion of the strainer 13 fitted in a concave portion 15 formed in a lower surface of an upper cap 14 of the tank 11. Thus, the inner pipe 12 is also held to an upper portion of the tank 11. At a side lower portion of the tank 11, a refrigerant outlet union 20 of the so-called one-touch joint type as a refrigerant outlet portion is attached so as to communicate with an inner bottom area of the tank 11. Those skilled in the art are aware of the so-called one-touch joint type outlet union. As mentioned above, by forming the refrigerant outlet portion 20 in a portion other than the lower end portion of the tank 11, a larger flange connection face 16 can be formed on the lower surface of the tank 11 so that the liquid-receiver 2 can be firmly flange connected to the liquid-receiver holder 3. Efficient pipe connecting can be achieved by adopting the above-mentioned one-touch joint type outlet union 20 as a refrigerant outlet portion. In the liquid-receiver 2, the refrigerant comes into the inner pipe 12 through the inlet port 17 and rises in the inner pipe 12 to flow into the tank 11. Then, the refrigerant flows out of the tank 11 through the refrigerant outlet union 20.

As shown FIG. 3A, the tank 11 includes a forged cylindrical tank body 21 having a bottom end and a forged upper cap 14 closing an upper opening of the tank body 21. Preferably, the tank body 21 and the upper cap 14 are made of forged aluminum. The upper cap 14 can be secured to the tank body 21 by any means including welding such as argon welding, or the like. The inner pipe 12 also can be made of aluminum. An outwardly protruded fixing pin 22 can be integrally formed on the upper middle portion of the upper cap 14.

Figure 6A:
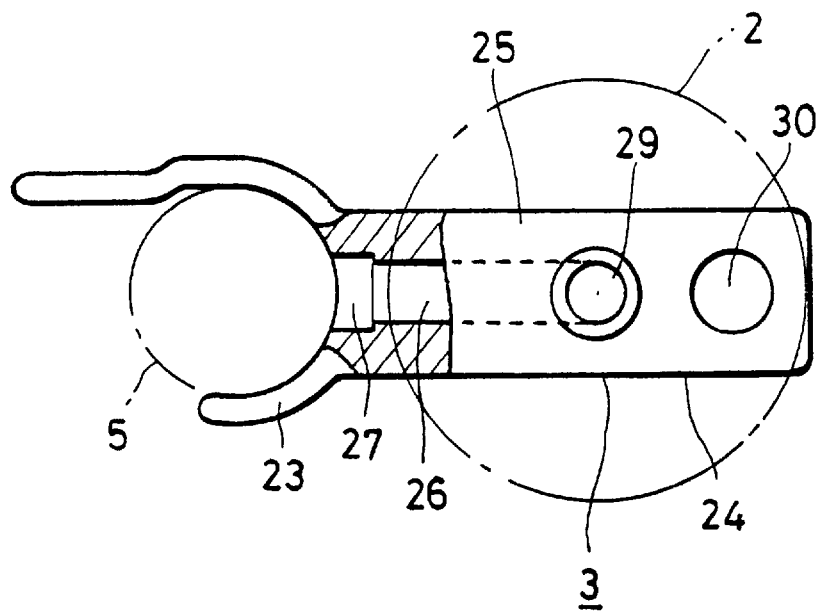
FIG. 6A is a partially broken plan view of the liquid-receiver holder and FIG. 6B is a partially broken side view of the liquid-receiver holder.
Figure 6B:
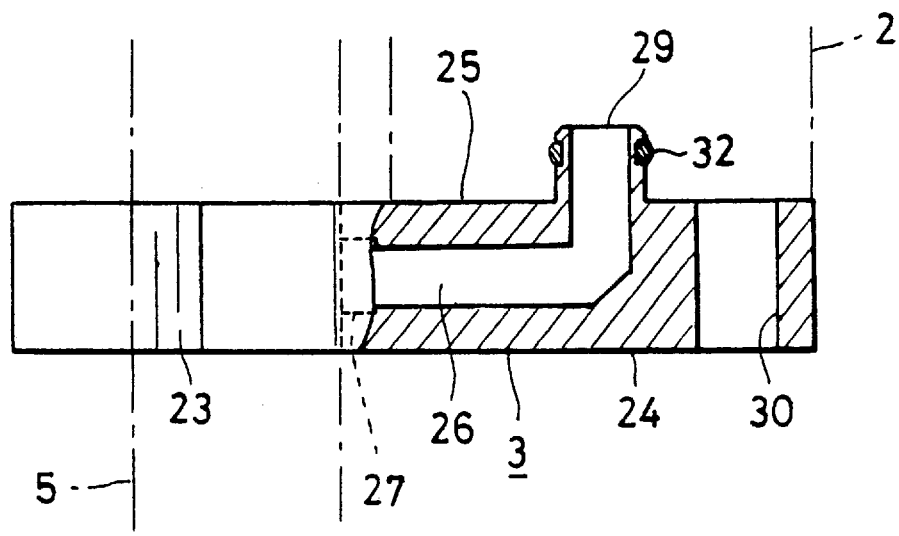

As shown in FIGS. 1, 6A and 6B, the liquid-receiver holder 3 is integrally provided with a fitting portion 23 which can be brazed to the header 5 of the condenser and a flange body 24 protruding from the fitting portion 23. The fitting portion 23 has an arc-shaped inner surface to be fitted to the outer surface of the header 5 along the circumferential direction thereof. The upper surface of the flange body 24 forms a flat flange connection surface 25. In the liquid-receiver holder 3, an inner passage 26 is formed so as to open to the flange connection surface 25 and the inner surface of the fitting portion 23. In the inner passage 26, an opening formed on the fitting portion 23 forms a refrigerant inlet 27 and the opening formed on the flange connection surface 25 forms a refrigerant outlet 29. The refrigerant outlet 29 is formed to have a cylindrical cross-section and protrudes upwardly so as to fit into the refrigerant inlet port 17 of the tank 11. The numeral 32 denotes a sealing O-ring. Adjacent to the refrigerant outlet 29, a bolt inserting hole 30 penetrates the holder 3 in the direction of the thickness thereof for flange connection.

The liquid-receiver holder 3 preferably is formed as follows. An aluminum extruded article having a cross-section as shown in FIG. 6A is sliced at a certain length and then the sliced article is processed. The shape or structure of the holder 3 is determined depending on the header 5 of the condenser body 1 and the liquid-receiver 2, but not depending on the structure of the body of a car. Therefore, there is no need to form and prepare various types of holders to accommodate different car bodies.

The liquid-receiver holder 3 preferably is fitted to the header 5 when the headers 5, tubes 4 and fins 6 are pre-assembled to form the condenser body 1 and then brazed to the outer surface of the header 5 when the pre-assembled condenser body 1 is brazed, preferably one-shot brazed. Those skilled in the art are capable of one-shot brazing a condenser body 1 and a liquid-receiver holder 3, using the guidelines provided herein. In detail, the fitting portion 23 is fitted to the outer surface of the header 5 so as to face the refrigerant inlet 27 of the fitting portion 23 to the refrigerant outlet opening 10 of the header 5. When fitting as mentioned above, as shown in FIG. 4, a short pipe 31 is disposed between the refrigerant inlet 27 of the fitting portion 23 and the refrigerant outlet opening 10 of the header 5 so that the liquid-receiver holder 3 is correctly positioned to the header 5 so that no-leaking occurs. In this manner, an efficiently sealed and brazed portion can be formed.

After pre-assembling the components as mentioned above, one-shot brazing is performed. One-shot brazing of the receiver holder 3 may be performed by a brazing layer clad on an outer surface of a pipe which is formed by rolling an aluminum brazing sheet so as to abut both ends thereof. As mentioned above, because the inner surface of the fitting portion 23 of the liquid-receiver holder 3 is formed so as to fit the outer surface of the header 5, special forming to the header 5 such as forming a dented portion, or the like, is not necessary. In addition, the fitting portion 23 which fits on the outer surface of the header 5 is easily formed because the liquid-receiver holder 3 is a sliced article of an aluminum extruded article of a given shape.

The liquid-receiver 2 can be assembled to the condenser body 1 to form a condenser with a liquid-receiver as follows. As shown in FIG. 1, the liquid-receiver 2 is held uprightly, and then the flange connection face 16 is placed on the flange connection surface 25 of the flange body 24 of the liquid-receiver holder 3 such that the outwardly protruded cylindrical refrigerant outlet 29 of the holder 3 is fitted into the circular refrigerant inlet port 17 of the liquid-receiver 2. By fitting the outlet 29 into the inlet port 17, the liquid-receiver 2 is accurately positioned on the liquid-receiver holder 3. By using the O-ring 32, the sealing between the liquid-receiver 2 and the liquid-receiver holder 3 is enhanced.

Thereafter, the liquid-receiver holder 3 is flange connected to the liquid-holder 2 by tightening the bolt 33 which is inserted in the bolt inserting hole 30 and into threaded hole 19. As a result, the liquid-receiver 2 is, at its bottom, firmly held to the condenser body 1. At the same time, the liquid-receiver 2 is connected to the condenser body 1 by way of the inner passage 26 in communication therewith. Thus, a conventional extraneous piping is not required which used to be required to connect the liquid-receiver 2 to the condenser body 1. Because the liquid-receiver holder 3 can be integrally connected to the header 5 beforehand, the liquid-receiver 2 can be connected to the liquid-receiver holder 3 by only flange connection. Therefore, the liquid-receiver 2 can be efficiently connected to the condenser body 1.

Figure 5:
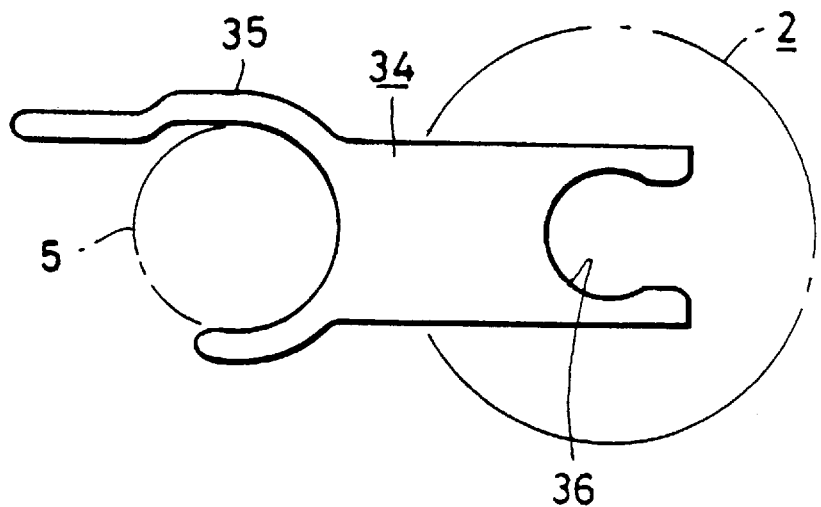
FIG. 5 is a plan view of a stay for holding the upper portion of the liquid-receiver to the condenser body.

The upper portion of the liquid-receiver 2 can be held to the condenser body 1 as follows. An outwardly protruded stay 34 is attached to the header 5 at the height of an upper end of the liquid-receiver 2. The stay 34 is formed by slicing an aluminum extruded article into a certain length. As shown in FIG. 5, the stay 34 has, at one end thereof, a fitting portion 35 to be fitted to the outer surface of the header 5 along the circumference direction thereof. The fitting portion 35 also can be brazed to the header 5 by one-shot brazing. At the other end of the stay 34, an inwardly enlarged concave portion 36 is formed. As shown in FIG. 1, the fixing pin 22 protruding from the upper cap 14 of the liquid-receiver 2 is fitted and held in the concave portion 36 by way of rubber mount 37 as a vibroisolating material. As mentioned above, the liquid-receiver 2 is, at both the lower and upper ends, firmly held to the condenser body 1.

In the condenser with a liquid-receiver, installing it to a body of a car can be performed by only installing the condenser body 1 to a body of a car-by using a bracket, or the like. As a result, the liquid-receiver 2 is automatically installed in a body of a car. This means that piping for connecting the liquid-receiver 2 and the condenser body 1 is not required. Therefore, installing to a body of a car can effectively be performed with less effort and with much fewer component parts.

In the condenser with a liquid-receiver, as shown by the arrows in FIG. 1, the refrigerant condensed in the condenser body 1 flows into the inner pipe 12 of the liquid-receiver 2 by way of the refrigerant outlet opening 10 formed on the lower side end of the header 5 of the condenser body 1, the inner passage 26 of the liquid-receiver 2 and the refrigerant inlet port 17 of the liquid-receiver 2. The refrigerant rises in the inner pipe 12 and flows out from the upper end portion of the inner pipe 12 through a strainer 13 into the inside of the tank 11. The refrigerant is divided into a liquified refrigerant and a gaseous refrigerant. The liquified refrigerant is stored in the lower portion of the tank 11 and the gaseous refrigerant stays in the upper portion of the tank 11. Only the liquefied refrigerant is sent out of the tank 11 through the refrigerant outlet union 20 attached to the lower portion of the tank 11 to function as a liquid-receiver.

Figure 12A:
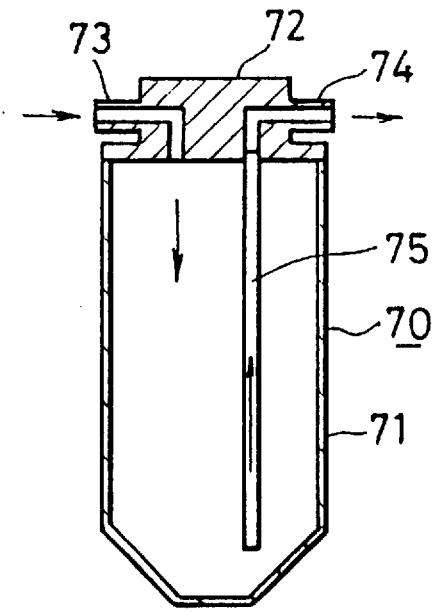
FIG. 12A is a vertical cross-sectional view of a conventional liquid-receiver.
Figure 12B:
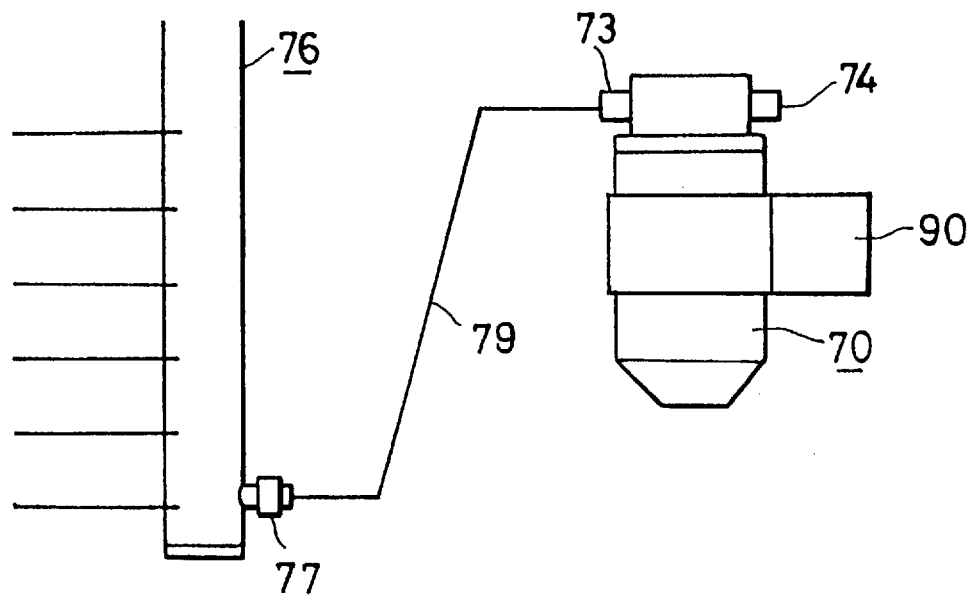
FIG. 12B is a front view showing a connecting and fixing states of a liquid-receiver to a header.

Because the refrigerant outlet union 20 of the liquid-receiver 2 is attached to the lower side portion of the tank 11 and that the liquefied refrigerant in the tank 11 is to directly flow out of the tank 11 through the outlet union 20, a conventional hung down outlet pipe 75 as shown in FIG. 12A is not required. Also, because the refrigerant from the condenser body 1 is directly introduced into the tank 11 through the inlet port 17 formed on the lower surface of the tank 11 and is blown up in the inner pipe 12, but is not blown up by the pressure in the tank 11 containing the liquefied and gaseous refrigerants in a divided state, the blow up height of the refrigerant becomes very high. Therefore, the height of the inner pipe 12 can be higher, thus enabling higher and more slim liquid-receiver 2 as shown in figures, when compared to conventional liquid-receivers. Because the upper end portion of the inner pipe 12 is held by the upper cap 14, the fixing stability of inner pipe 12 is improved and thus the inner pipe 12 can be longer and the liquid-receiver 2 can be higher and more slim. As a result, by disposing the liquid-receiver 2 along and parallel to the header 5 of the condenser body 1, the liquid-receiver 2 can be incorporated with the condenser body 1, and thus a compact integral structure which does not cause problems on installing space can be obtained.

FIGS. 7A and 7B illustrate a modified embodiment of a liquid-receiver. The liquid-receiver 2 preferably includes an aluminum forged cylindrical tank body 21 having an upper end and an aluminum forged lower cap 40 closing a lower opening of the tank body 21. The lower cap 40 is secured to the tank body 21 by welding such as argon welding, or the like. The lower cap 40 is provided with a refrigerant inlet port 17. The lower surface of the cap 40 forms a flange connection face 16. As shown in FIG. 7B, the cap 40 is, at its side portion, integrally provided with a protruded refrigerant outlet portion 20 and is, at its inside, provided with a passage 41 which communicates the inside of the tank 11 with the refrigerant outlet portion 20. A desiccant unit 42 including a desiccant or a filter is disposed around the outer surface of the upper portion of the inner pipe 12, and thus the upper portion of the inner pipe 12 is held by the upper portion of the tank 11 by way of the desiccant unit 42. The remaining features are the same as the above-mentioned embodiment.

Figure 8:
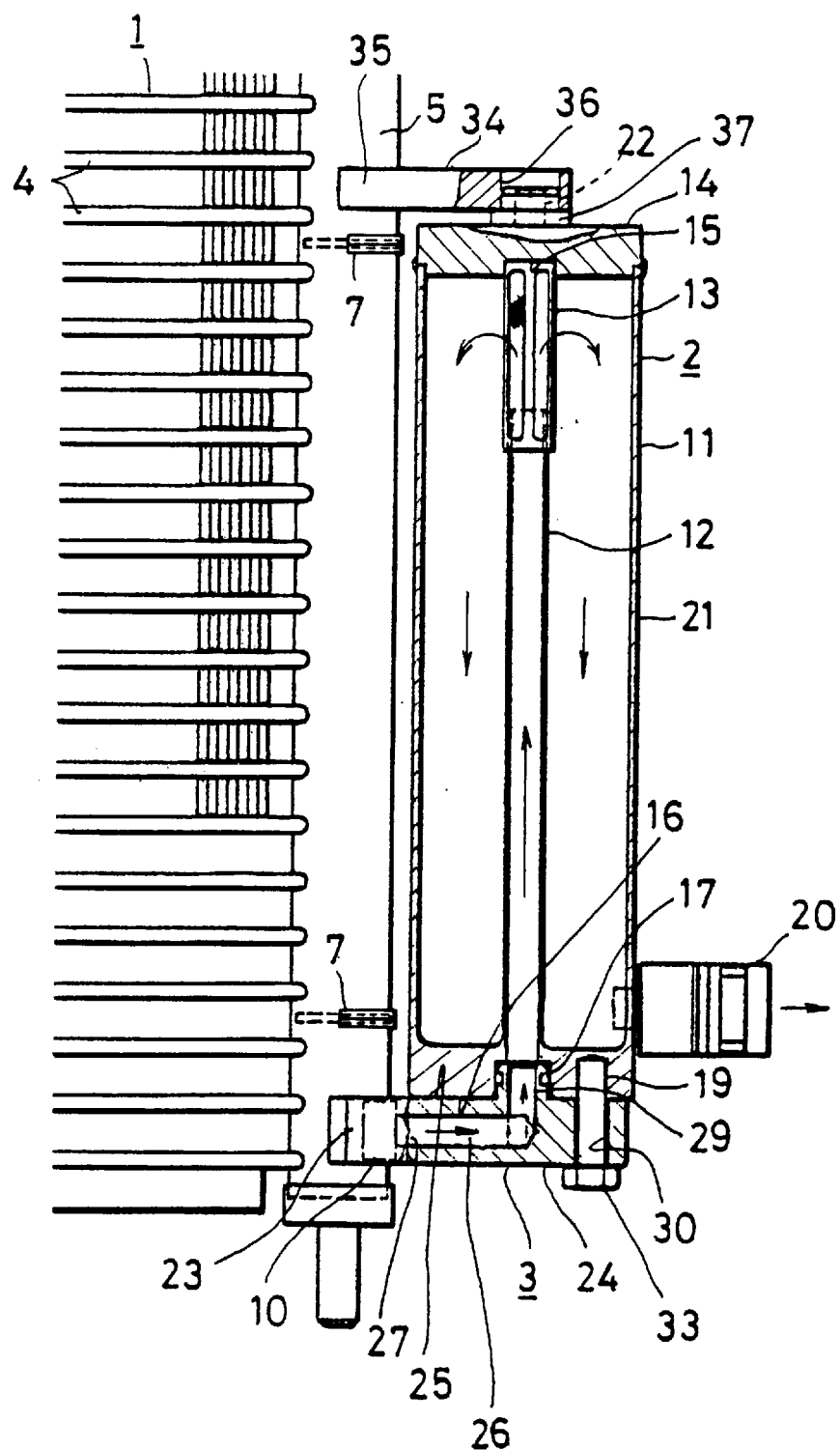
FIG. 8 is a cross-sectional front view of another modified embodiment of a liquid-receiver.

FIG. 8 illustrates another embodiment of the liquid-receiver of the present invention. In the receiver 2, the inner pipe 12 and the tank body 21 are an integrally formed aluminum forged article. The remaining features are the same as the first embodiment.

Figures 9A, 9B, 9C:
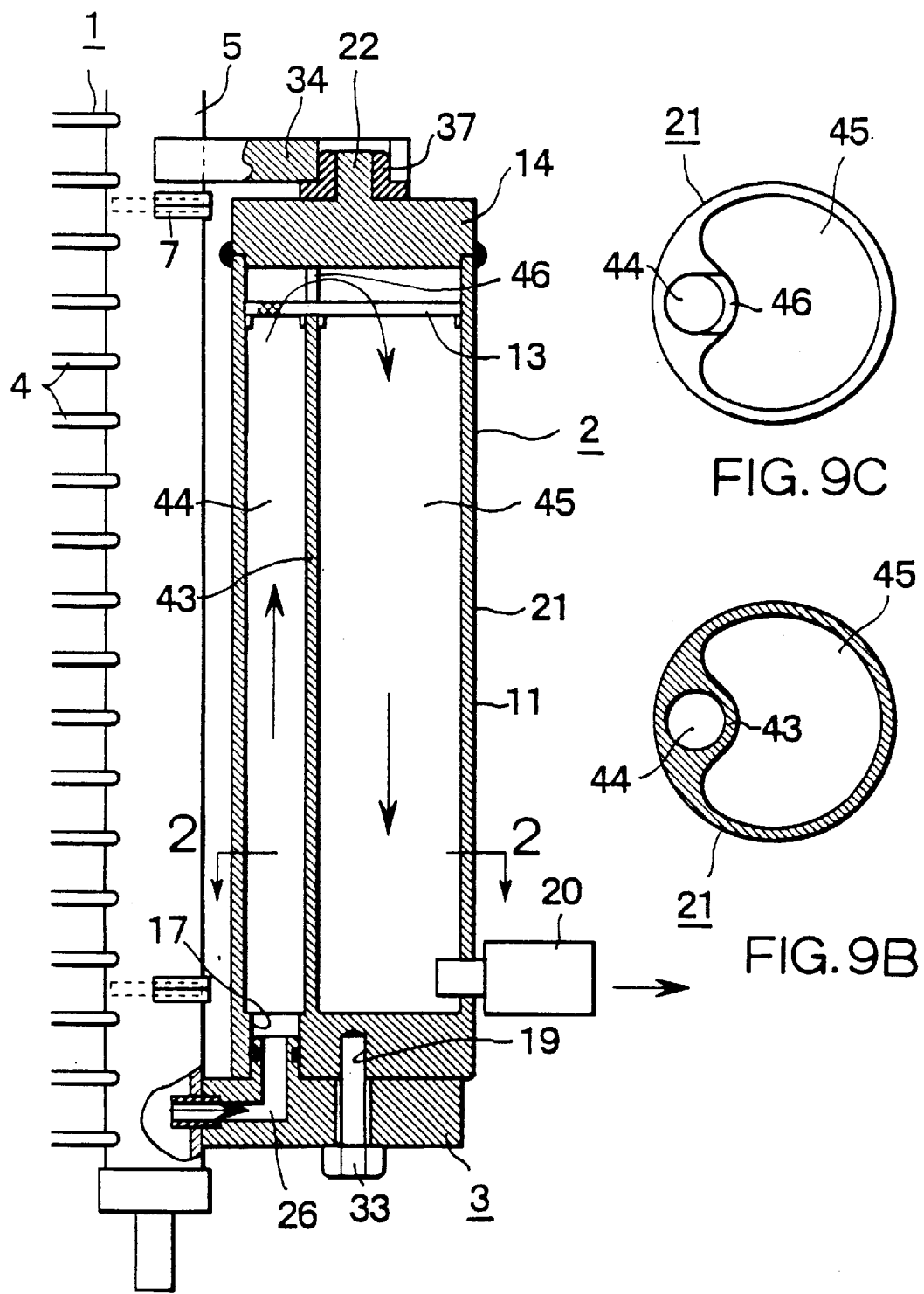
FIG. 9A is a cross-sectional front view of a still another modified embodiment of a liquid-receiver.
FIG. 9B is a cross-sectional view taken along the line 2—2 of FIG. 9A.
FIG. 9C is a plan view of the upper portion of a tank body.

FIGS. 9A, 9B and 9C illustrate yet another embodiment of the liquid-receiver of the invention. In the liquid-receiver 2, the inside of the tank 11 is divided into a refrigerant inlet-side chamber 44 and a refrigerant outlet-side chamber 45 by a vertically disposed partition wall 43. Both the chambers 44, 45 are communicated with each other through a communicating portion 46 formed on an upper portion of the partition wall 43. At the bottom of the tank 11 a refrigerant inlet port 17 communicating with the refrigerant inlet-side chamber 44 is formed. At the lower side portion of the tank 11, a refrigerant outlet portion 20 communicating with the refrigerant outlet-side chamber 45 is formed. The refrigerant inlet-side chamber 44 functions as the inner pipe 12 shown in the first embodiment. The tank 11 includes an integrally formed aluminum forged cylindrical tank body 21 having a lower end and the partition wall 43. The upper opening of the tank body 21 is closed by a cap 14. The remaining features are the same as the first embodiment.

Figure 10A:
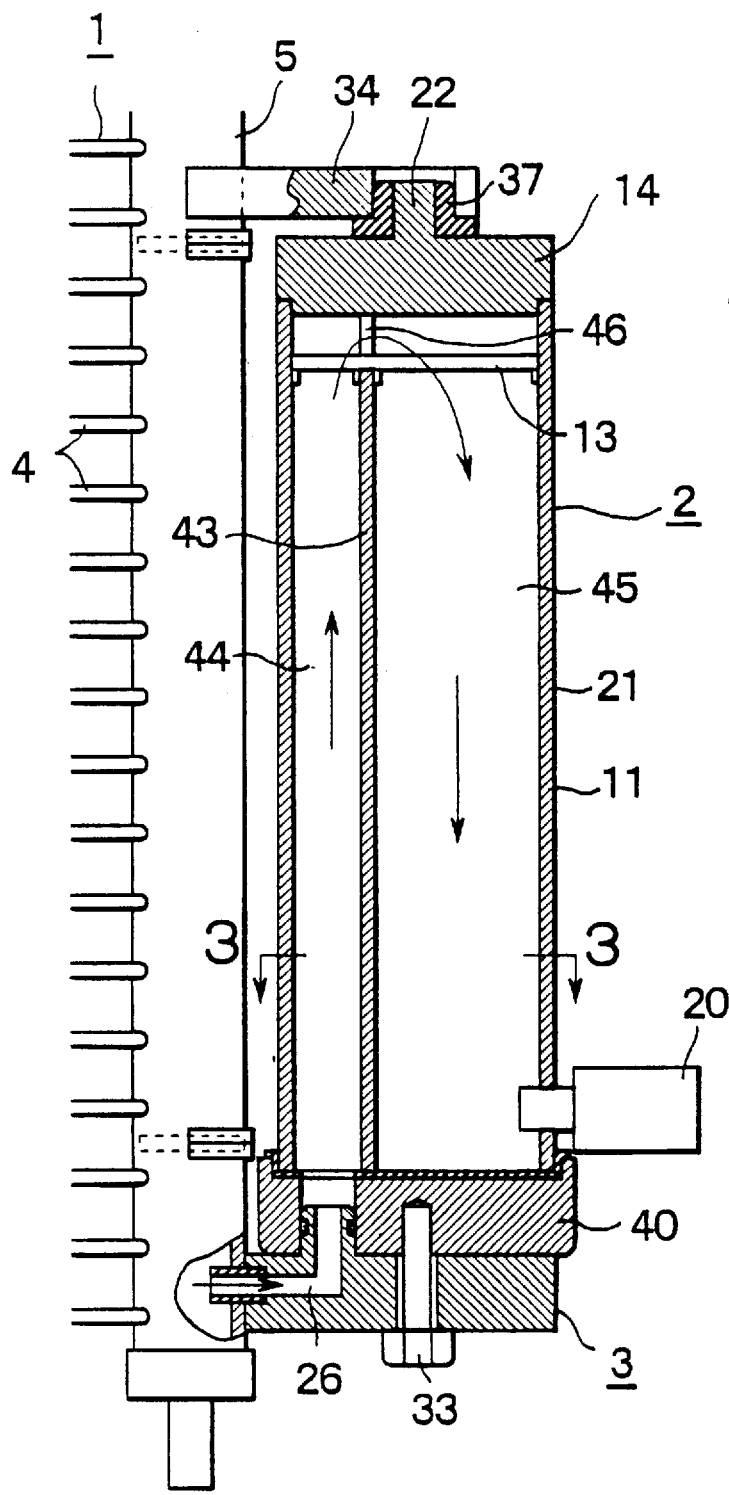
FIG. 10A is a cross-sectional front view of a yet another modified embodiment of a liquid-receiver.
Figure 10C:
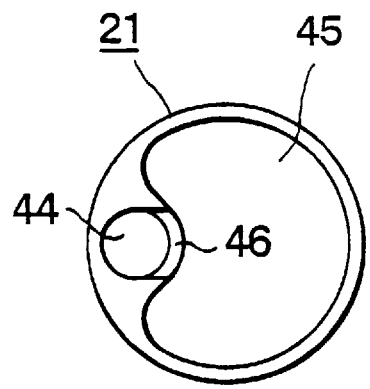
FIG. 10C is a plan view of the upper portion of a tank body.
Figure 10B:
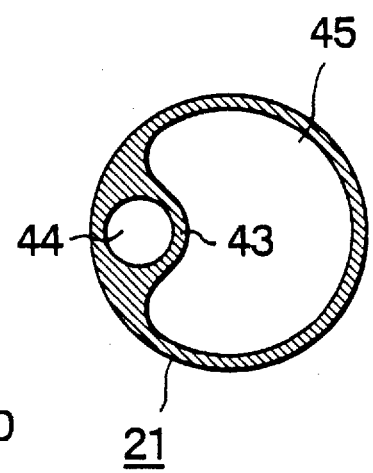
FIG. 10B is a cross-sectional view taken along the line 3—3 of FIG. 10A.

FIGS. 10A, 10B, 10c illustrate a further embodiment of the liquid-receiver of the invention. In the liquid-receiver 2, though the tank 11 has the same type of partition shown in FIGS. 9A to 9C, the tank 11 includes an aluminum cylindrical tank body 21 with a partition wall 43 which are integrally extruded, and caps 14, 40 closing the upper and lower end portion of the tank body 21, respectively. The remaining features are the same as the above embodiment.

FIGS. 11A, 11B and 11C illustrate a preferred and modified fixing structure of the upper portion of the liquid-receiver 2 to the header 5. The numeral 50 denotes a U-shaped clip which is an integrally formed elastic synthetic resin article preferably made of, for example, nylon 66, or the like. The stay 34 has, at its leading edge, a front opened concave portion 36. Inside of the concave portion 36, locking portions 52 for locking ledges 51 of the clip 50 are formed. The clip 50 has, at the upper and lower edges, outwardly protruded edges 53, 53 for clipping the stay 34 from the upper and lower direction thereof.

The upper portion of the liquid-receiver 2 can be fixed to the header 5 as follows. First, the clip 50 is forcibly fitted around the outer peripheral portion of the fixing pin 22. Then the clip 50 is forcibly pushed into the concave portion 36 of the stay 34 while elastically widening the stay 34 until the clip 50 is elastically locked in the concave portion 36. Thus, the ledges 51 are locked in the concave portion 36 so as to hold the liquid-receiver 2. The clip 50 is prevented from being pulled out in the direction of side from the stay 34 by the engagements of the ledges 51 in the concave portion 36, and is also prevented from being pulled out in the direction of up and down from the stay 34 by the engagements of the protruded edges 53 and the stay 34.

Though preferred embodiments according to the present invention are described, it should be recognized that various modifications are possible within the scope of the present invention. For example, the refrigerant inlet portion may be formed on the upper surface of the liquid-receiver, and the liquid-receiver holder may be flange connected at the upper surface of the liquid-receiver. In other words, the refrigerant outlet portion may be formed at the upper portion of the liquid-receiver and a hung down inner pipe may be connected to the outlet portion.

In the condenser with a liquid-receiver, because the liquid-receiver is held by the header of the condenser body, the structure of the holding parts for holding the liquid-receiver is not limited to the structure of a body of a car to be installed, thus enabling the sharing of parts for holding the liquid-receiver, and reducing the costs. Further, because the liquid-receiver can be held to the condenser body beforehand by installing the condenser with a liquid-receiver to a body of a car, the installation of both the liquid-receiver and the condenser body can be performed at the same time. Thus, efficient mounting to a body of a car can be enhanced.

Furthermore, because the liquid-receiver holder is provided with inner refrigerant passage with one end thereof being connected to the refrigerant outlet portion of the header and the other end being connected to the refrigerant inlet portion of the liquid-receiver, the refrigerant outlet portion of the condenser and the refrigerant inlet portion of the liquid-receiver can be communicated with one another by holding the liquid-receiver to the condenser body by way of the liquid-receiver holder. Thus, piping can be omitted, the number of parts can be reduced and further troublesome piping work also can be omitted.

The liquid-receiver has, at its flat end portion, a refrigerant inlet portion having a relatively large area, and the liquid-receiver and the liquid-receiver holder can be integrally connected by a flange connection at the large flat end portion. Therefore, the liquid-receiver can be easily and firmly flange connected to the liquid receiver holder with large flange connection area.

The terms and expressions which have been employed herein are used as terms of description and not of limitation, and there is no intent, in the use of such terms and expressions, of excluding any of the equivalents of the features shown and described or portions thereof, but it is recognized that various modifications are possible within the scope of the invention claimed.

What is claimed is:

1. A condenser with a liquid-receiver, comprising:
   a condenser body having at least one header having a refrigerant outlet, a plurality of tubes connected to the at least one header in fluid communication therewith;
   a liquid-receiver;
   a liquid-receiver holder for holding the liquid-receiver to the condenser body; and a flange connection for connecting the liquid-receiver to the liquid-receiver holder;

wherein the liquid-receiver has at its one end surface a refrigerant inlet portion;

wherein the liquid-receiver holder is provided with a refrigerant passage therein with a first end of the refrigerant passage being in fluid communication with the refrigerant outlet of the at least one header and a second end of the refrigerant passage being in fluid communication with the refrigerant inlet portion of the liquid-receiver; and wherein the liquid-receiver holder connects the one end surface of the liquid-receiver to the condenser body by the flange connection.

2. The condenser with a liquid-receiver as recited in claim 1, wherein the refrigerant inlet portion of the liquid-receiver and the second end of the refrigerant passage are connected by insertion.

3. The condenser with a liquid-receiver as recited in claim 2, wherein an O-ring is provided as a sealing material between the refrigerant inlet portion of the liquid-receiver and the second end of the refrigerant passage.

4. The condenser with a liquid-receiver as recited in claim 1, wherein the refrigerant outlet portion of the liquid-receiver is formed on a portion other than an end surface to which the liquid-receiver holder is connected by the flange connection.

5. The condenser with a liquid-receiver as recited in claim 4, further comprising a one-touch joint type union attached to the refrigerant outlet portion of the liquid-receiver.

6. The condenser with a liquid-receiver as recited in claim 1, wherein the liquid-receiver holder has a fitting surface that is fitted and brazed to an outer surface of the at least one header, wherein a refrigerant passage opens to the fitting surface, and wherein the fitting surface is fitted and brazed to the outer surface of the at least one header by one-shot brazing so that the refrigerant passage is communicated with the refrigerant outlet of the at least one header.

7. The condenser with a liquid-receiver as recited in claim 6, further comprising a short pipe disposed between the refrigerant outlet of the at least one header and the refrigerant passage of the liquid-receiving holder.

8. The condenser with a liquid-receiver as recited in claim 6, wherein the liquid-receiver holder is a sliced article of an extruded article.

9. The condenser with a liquid-receiver as recited in claim 1, wherein the at least one header is disposed vertically and has at one end of the length thereof the refrigerant outlet;

wherein the liquid-receiver is disposed vertically and has at one end of the length thereof the refrigerant inlet portion;

wherein the liquid-receiver holder is disposed perpendicular to the longitudinal direction of the at least one header and has a flange connection face at one of its surfaces thereof, and the refrigerant passage opens to the flange connection face; and wherein the liquid-receiver is disposed adjacent to and parallel with the at least one header with one surface of the liquid-receiver being placed on one of the surfaces of the liquid-receiver holder and flange connected to the liquid-receiver holder by the flange connection.

10. The condenser with a liquid-receiver as recited in claim 9, wherein the refrigerant outlet is formed on a lower portion of the at least one header, the refrigerant inlet portion is formed on a lower end of the liquid-receiver, the liquid-receiver holder has at its upper surface a flange connection face, and the liquid-receiver is flange connected to the liquid-receiver holder with a lower end surface of the liquid-receiver being placed on an upper surface of the liquid-receiver holder.

11. The condenser with a liquid-receiver as recited in claim 9, further comprising an inner pipe vertically disposed in the liquid-receiver so as to communicate with the refrigerant inlet portion, whereby the refrigerant from the condenser body flows toward an end portion of the inner pipe into a tank of the liquid-receiver.

12. The condenser with a liquid-receiver as recited in claim 11, wherein an end of the inner pipe is supported to one end portion of the liquid-receiver.

13. The condenser with a liquid-receiver as recited in claim 11, wherein an end portion of the inner pipe is liquid-tightly connected to the refrigerant inlet portion of the liquid-receiver by way of a rubber holding.

14. The condenser with a liquid-receiver as recited in claim 11, wherein the inner pipe is integrally formed by forging together with an area forming the refrigerant inlet portion of said liquid-receiver.

15. The condenser with a liquid-receiver as recited in claim 9, wherein the liquid-receiver has a tank which is divided by a partition wall into a right side chamber and a left side chamber, one of them being a refrigerant inlet chamber and the other being a refrigerant outlet chamber, both chambers being communicated with one another by a communicating portion formed on an upper portion of the partition wall; and wherein the liquid-receiver includes the refrigerant inlet portion communicating with the refrigerant inlet chamber at the lower surface of the liquid-receiver and the refrigerant outlet portion communicating with the refrigerant outlet chamber at the lower end portion of the liquid-receiver.

16. The condenser with a liquid-receiver as recited in claim 9, further comprising a fixing pin protruding from an end of the liquid-receiver opposite to an end portion of the surface for connecting the liquid-receiver holder, wherein the fixing pin is connected to a stay protruding from the condenser body.

17. The condenser with a liquid-receiver as recited in claim 16, further comprising a vibroisolating material around the fixing pin, wherein the fixing pin is connected to the stay by the vibroisolating material.

18. The condenser with a liquid-receiver as recited in claim 1, wherein the condenser body and the liquid-receiver holder are made of aluminum or an alloy thereof.

* * * * *